United States Patent [19]
Meiler et al.

[11] Patent Number: 5,842,819
[45] Date of Patent: Dec. 1, 1998

[54] CUTTING TOOL WITH DOUBLE CUTTING EDGES

[76] Inventors: Ruedi Meiler, Konstrukteur, Schran 509, CH-7220 Schiers; Mathias Accola, Mechaniker, Schulstrasse 55, CH-7302, Landquart, both of Switzerland

[21] Appl. No.: 715,440

[22] Filed: Sep. 18, 1996

[30] Foreign Application Priority Data

Sep. 19, 1995 [DE] Germany ............ 295 14 965 U

[51] Int. Cl.⁶ .................................... B23D 7/00
[52] U.S. Cl. ................ 407/103; 407/113; 407/120; 409/303; 83/49; 144/124
[58] Field of Search ...................... 407/113, 114, 407/70, 69, 103, 120; 409/303, 138; 144/124, 126; 83/49, 581, 620, 41, 302

[56] References Cited

U.S. PATENT DOCUMENTS

| | | | |
|---|---|---|---|
| 1,629,667 | 5/1927 | Knipple | 407/103 |
| 4,404,882 | 9/1983 | Mock | 409/303 X |
| 4,449,864 | 5/1984 | Haque et al. | 407/120 X |
| 4,474,721 | 10/1984 | Carpenter | 407/69 X |
| 4,552,492 | 11/1985 | Komanduri et al. | 407/114 |
| 5,064,317 | 11/1991 | Gardner | 407/70 |

FOREIGN PATENT DOCUMENTS

| | | |
|---|---|---|
| 1172515 | 6/1964 | Germany . |
| 1225468 | 9/1966 | Germany . |
| 3004881 | 8/1981 | Germany . |

*Primary Examiner*—Andrea L. Pitts
*Assistant Examiner*—Henry W. H. Tsai
*Attorney, Agent, or Firm*—Pepe & Hazard LLP

[57] ABSTRACT

A machining tool beveling the edges of workpieces such as sheet metal is movable relative to the workpiece in the feed direction along the edge of the workpiece and in an action direction perpendicular to the feed direction. It has at least two adjacent cutting edges extending in the feed direction, one of which is the leading edge and the other of which is the trailing edge which is offset from the leading edge. The trailing cutting edge will effect a further cut in the workpiece as the tool is moved along the edge of the workpiece and reciprocated against its edge portion.

15 Claims, 4 Drawing Sheets

CUTTING TOOL WITH DOUBLE CUTTING EDGES

BACKGROUND OF THE INVENTION

The invention concerns a machine tool, especially for beveling the edges of workpieces, preferably sheet metal, wherein the tool can be moved relative to the workpiece in the feed direction along the edge of the workpiece to be machined and perpendicular to the feed direction in the action direction.

Such tools are used, for example, to machine the sheet metal in preparation for a later welding process. The edge of the sheet metal in question is beveled for this purpose. The beveled surface resulting therefrom borders the welding groove later used to produce a butt weld.

During machining the leading cutting edge in the feed direction is set back from the trailing cutting edge in the action direction. The leading edge is used to cut some of the beveled surface on the edge of the workpiece. In starting to cut the edge of the sheet metal, the tool is pushed along the edge of the sheet metal with its leading edge in the feed direction until the beveled surface to be produced is partially cut. Next, the tool is moved back in the opposite direction and pushed in the feed direction relative to the sheet metal in such a way that it takes off the part of the edge left standing by the leading edge that still needs to be removed. This produces the beveled surface with the trailing edge during the next movement in the action direction and thus produces a completely beveled surface. Along with the removal of the remainder of the edge of the workpiece projecting in the action direction, the leading edge does some free cutting of the beveled surface in the workpiece area next to the trailing edge in the feed direction. If the resulting beveled surface is relative rough, a relatively thin sliver is taken off in a second pass to smooth the beveled surface of the edge of the workpiece by "roughing it up", after first changing the relative position of the tool and the workpiece, and "planing" the whole beveled surface.

The object of the present invention is to provide a tool to make it simpler to produce machined edge surfaces that have the desired surface configuration along the edges of the workpieces.

SUMMARY OF THE INVENTION

The present invention achieves this objective with a machining tool which has at least one cutting edge which is offset perpendicularly to the workpiece in the feed direction, relative to at least one cutting edge forwardly thereof in the feed direction. This cutting edge is angularly disposed to the plane defined by the direction of the cutting and the feed direction. The leading edge is used to cut the surface to be produced, partially or completely, as the tool moves in the action direction. After the return stroke of the tool and the subsequent movement of the tool relative to the workpiece in the feed direction, the leading edge of the tool is set against the part of the workpiece edge next to the surface already cut. Thus, at the same time, the trailing cutting edge is disposed in the area of the beveled surface already produced by the leading cutting edge. Now, if the tool is moved in the action direction, the leading edge clears a new surface section completely or partially, and the trailing cutting edge at the same time removes a sliver from the surface already machined by the leading edge, and its thickness roughly corresponds to the amount of the offset of the cutting edges next to one another and perpendicular to the plane defined by the action direction and the feed direction. The "roughing" by the leading edge takes place contemporaneously with the "planing" by the trailing cutting edge, and the tool works with a stroke count of, for example, 500 strokes per minute in the action direction. As described, the surfaces to be cut on the edge of the workpiece, for example, beveled surfaces on the edges of sheet metal, can be produced in one pass with the desired surface structure.

As for the configuration of the surfaces produced, good machining results can be achieved with an embodiment of the tool of the present invention that has at least two cutting edges offset from one another in the action direction, and wherein at least one leading edge is offset in relation to at least one trailing edge in the action direction.

The machining results are also desirable if, as seen in one version of the present invention, at least one of the cutting edges extends basically perpendicular to the action direction and/or at least one of the cutting edges extends at a sharp angle, preferably an angle of at least 60°, to the action direction.

Basically, the tools of the present invention can have almost any number of cutting edges offset from the workpiece in relation to one another and angularly disposed to the plane defined by the action direction and the feed direction. One convenient embodiment of the invention provides three cutting edges; the rearmost cutting edge in the feed direction is offset from the workpiece, compared to the neighboring leading edge in the feed direction, perpendicularly to the plane defined by the action direction and the feed direction. By means of such tools, the area to be removed on the edge of the workpiece can be taken off in three layers. When beveling sheet metal edges which extend substantially perpendicularly to one another, the leading cutting edge in the feed direction cuts an area configured as a perpendicular prism with a basic surface in the form of a right triangle. The cutting edges next to the cutting edge which first makes contact in the feed direction remove one sliver after each other from the resultant beveled surface.

To be able to machine pieces in opposite feed directions with the same tool, one preferred embodiment of the invention has three cutting edges, and the middle cutting edge is offset from the workpiece in the feed direction as compared to the cutting edges on both sides of it, perpendicularly to the plane defined by the action direction and the feed direction.

Conveniently, on tools of the present invention with three cutting edges, the middle edge in the feed direction is offset compared to the cutting edges on both sides of it in the action direction.

Another preferred embodiment of a tool of the present invention with three cutting edges is characterized by the fact that the middle edge in the feed direction extends substantially perpendicularly to the action direction, and the cutting edges next to the middle cutting edge on both sides form a sharp angle with the action direction, preferably an angle of at least 60°.

Homogeneous machining results in two opposite feed directions can be achieved in one advantageous embodiment of the tool of the invention by having an uneven number of, and at least three, cutting edges. The cutting edge in the middle in the feed direction is offset from the workpiece, compared to the other cutting edges, perpendicular to the plane defined by the action direction and the feed direction, and the cutting edges next to the middle cutting edge on both sides are arranged and designed mirror-symmetrically in relation to a plane of symmetry running through the middle cutting edge in the action direction and perpendicular to the plane defined by the action direction and the feed direction.

BRIEF DESCRIPTION OF THE DRAWINGS

The invention will be described in greater detail below using schematic drawings of examples of embodiment.

DETAILED DESCRIPTION OF THE PREFERRED EMBODIMENT

Figure 1:
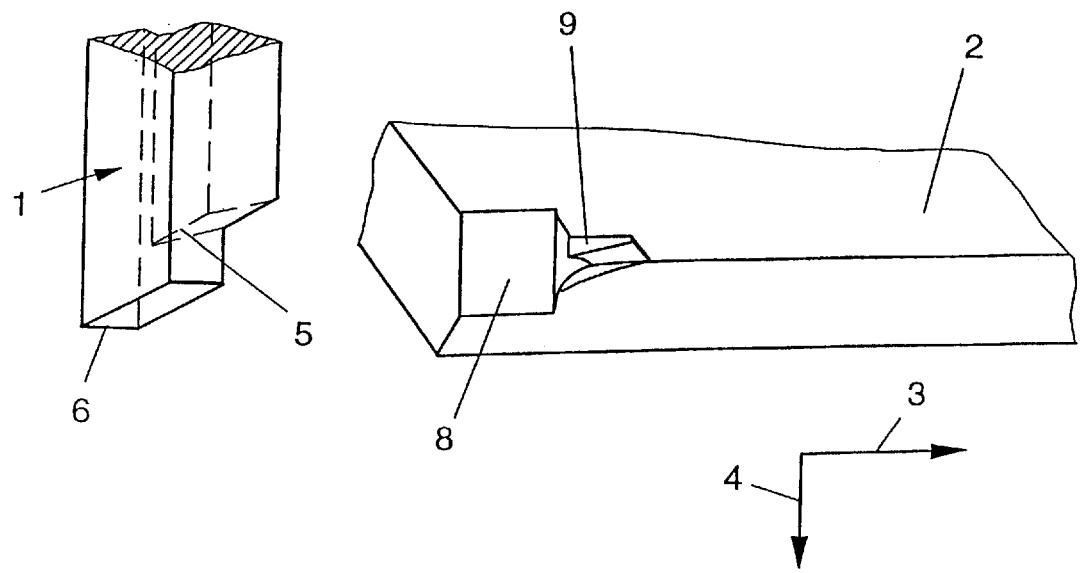
FIG. 1 are fragmentary diagrammatic showings in perspective view of a first embodiment of a shaping tool embodying the present invention and a fragmentary view of a workpiece partially machined by it.

There is seen in FIG. 1 a shaping tool 1 for beveling the edge of a workpiece 2 in the form of a piece of sheet metal. For this purpose, the shaping tool 1 can move relative to the sheet metal workpiece 2 in the feed direction illustrated by arrow 3 and in the action direction shown by arrow 4. The shaping tool 1 moves in the feed direction 3 as soon as the shaping tool 1 is no longer in contact with the sheet metal 2, i.e, after it has made its cut in the workpiece.

Figure 2:
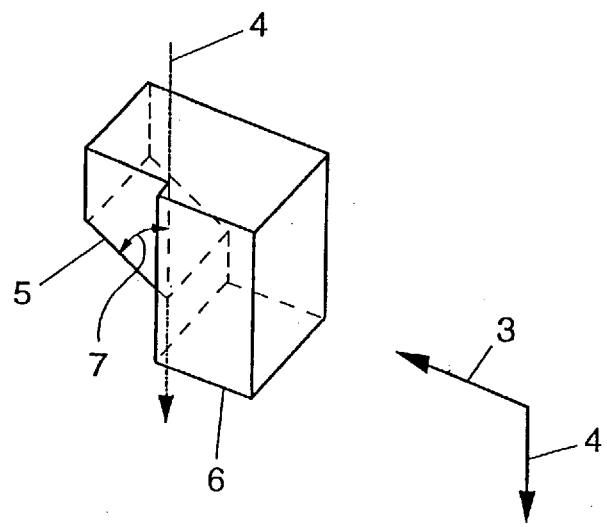
FIG. 2 is a view of the shaping tool of FIG. 1 as seen from the workpiece.

As can be seen from FIGS. 1 and 2, the shaping tool 1 has two cutting edges 5, 6 on the side facing the sheet metal 2 during the machining operation. The cutting edge 5 is the leading cutting edge in the feed direction 3, and the cutting edge 6 is the trailing cutting edge in the feed direction 3. Perpendicular to the plane defined by the action direction 4 and the feed direction 3, the lagging cutting edge 6 is offset from the sheet metal 2 in relation to the leading cutting edge 5. The leading cutting edge 5, which forms an angle 7 of about 60° with the action direction 4, is also offset relative to the trailing cutting edge 6 in the action direction 4.

When machining the sheet metal 2, the shaping tool 1 is first placed on it to produce a starting cut with the leading edge 5 in one corner of the sheet metal 2 as it is moved in the action direction 4. As can be seen from FIG. 1, the edge of the sheet metal 2 in question is not completely cut through by the leading cutting edge 5. Because of a corresponding limitation in the stroke of the shaping tool 1 in the action direction 4, the leading cutting edge 5 cuts only a notch in the edge of the sheet metal 2. The trailing cutting edge 6 is not in contact with the sheet metal 2 while the starting cut is being made by the leading cutting edge 5.

Now, when the leading edge 5 has reached its lowest position in the action direction 4, the movement of the shaping tool 1 is reversed, i.e, it is moved upwardly opposite the action direction 4, until the trailing cutting edge 6 is over the sheet metal 2 in the opposite direction from the action direction 4. Now, the shaping tool 1 can be moved in the feed direction 3 in relation to the sheet metal 2 until the trailing cutting edge 6 is roughly aligned with the notch already cut by the leading edge 5.

On the next stroke of the shaping tool 1 in the action direction 4, the trailing cutting edge 6 strikes the sheet metal 2 along a line that runs parallel to the line along which the leading cutting edge 5 struck the sheet metal 2. It is offset in the sheet metal 2 opposite the line of impact of the leading cutting edge 5, because of the offset of the leading cutting edge 5 and the trailing cutting edge 6, perpendicular to the plane defined by the action direction 4 and the feed direction 3. As the shaping tool 1 continues to move in the action direction 4, the trailing cutting edge 6 first removes a sliver of sheet metal behind the notch 9 cut by the leading cutting edge 5, before it penetrates into the area on the edge of the sheet metal 2 not yet worked by the leading cutting edge 5. This produces a continuous beveled surface portion 8, whose width in the feed direction is an extension of the trailing cutting edge 6 in that direction. At the same time the beveled surface portion 8 described by the cutting edge 6 is cut, the leading cutting edge 5, which is above the trailing cutting edge 6 in the feed direction 3, has cut another notch next to the beveled surface portion in the feed direction 3. The tooling cycle described is repeated until the edge of the sheet metal 2 in question is beveled along the desired length in the feed direction 3. The beveled surface produced, one section 8 of which is shown in FIG. 1 next to a notch 9 cut by the leading cutting edge 5, has a smooth surface.

The shaping tool 1 is connected to a regular drive unit by a conventional workpiece holder to drive it in the action direction 4, e.g, downwardly, and to execute the return stroke in the opposite direction. Like the shaping tool 1, this drive unit is an integral part of a portable device, as is known, for example, from German Patentschrift 12 25 468 and German Patentschrift 30 04 881. The relative movement between the shaping tool 1 and the sheet metal 2 in the feed direction 3 can be brought about manually, for example. Likewise, it is possible to use a motor drive for the relative movement of the shaping tool 1 and the sheet metal 2 in the feed direction.

Figure 3:
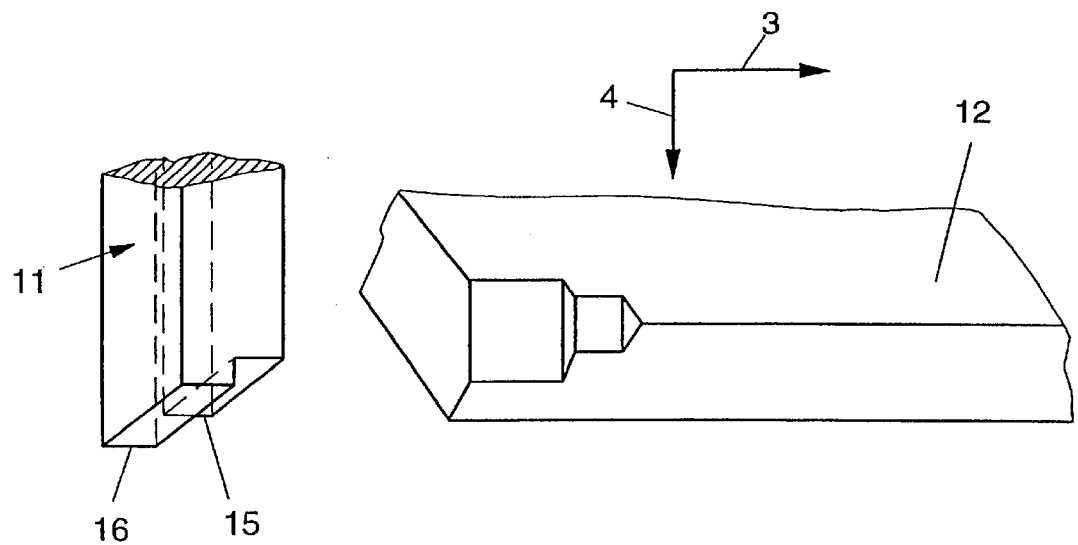
FIG. 3 are a similar fragmentary diagrammatic showings of a second embodiment of a shaping tool and of a partially machined workpiece.

The operation of the tool 11 shown in FIG. 3 basically corresponds to the operation of the shaping tool 1 in FIG. 1. The shaping tool 11 has a front cutting edge 15 and a rear cutting edge 16. The front cutting edge 15, like the rear cutting edge 16, extends in the feed direction. In the action direction 4, the cutting edges 15, 16 are offset from one another, and the rear cutting edge 16 is arranged ahead of the leading cutting edge 15 in the action direction 3. On the side of the shaping tool 11 facing the sheet metal 12, the rear cutting edge 16 is offset from the sheet metal 12, in relation to the front cutting edge 15, perpendicular to the plane defined by the action direction 3 and the feed direction 4. Both cutting edges 15, 16 extend perpendicularly to the action direction 4.

As can be seen from FIG. 3, the cutting edges 15, 16 are arranged in relation to one another in the action direction 4, and the path of the shaping tool 11 in the action direction 4 is chosen so that the leading cutting edge 15 forms a continuous beveled surface on the edge of the sheet metal 12 in the action direction 4. The trailing cutting edge 16 cuts a beveled surface parallel to the beveled surface produced by the leading cutting edge 15 with the desired surface structure. While the leading cutting edge 15 removes an area of the workpiece in the form of a perpendicular prism with a basic surface in the form of a right triangle, the trailing cutting edge 16 takes off a sliver of sheet metal less than 1 mm thick.

Figure 4:
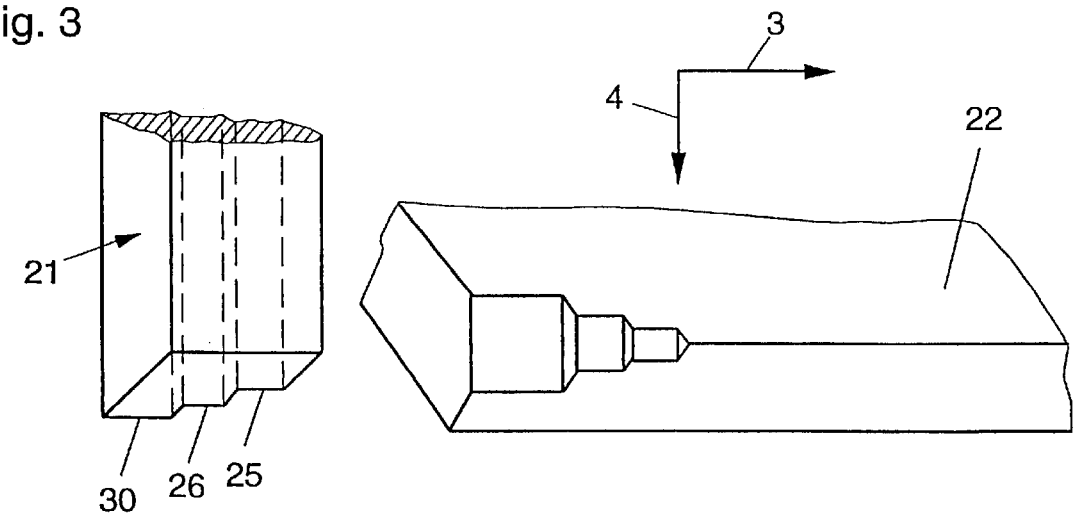
FIG. 4 are similar diagrammatic showings of a third embodiment of shaping tool and workpiece.
Figure 5:
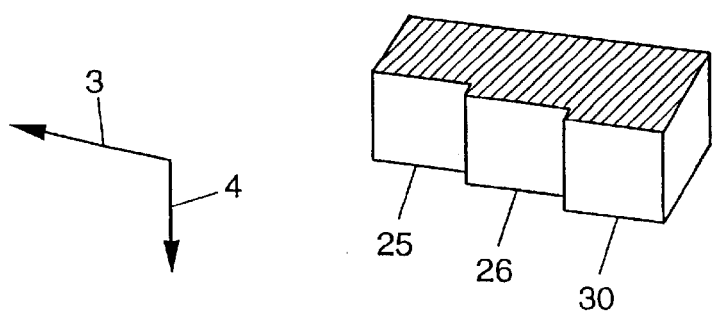
FIG. 5 shows the shaping tool of FIG. 4 as viewed from the workpiece.

FIGS. 4 and 5 show a shaping tool 21 for tooling the edge on a workpiece of sheet metal 22. Like the shaping tool 1 in FIGS. 1 and 2 and the shaping tool 11 in FIG. 3, the shaping tool 21 is also moved relative to the sheet metal 22 both in the action direction 4 and also in the feed direction 3. Unlike the shaping tools 1, 11 already described, the shaping tool 21 has three cutting edges, namely a leading cutting edge 25 in the feed direction 3 and trailing cutting edges 26 and 30 behind it. All the cutting edges 25, 26, 30 extend perpendicularly to the action direction 4. Cutting edge 30 is perpendicular to the plane defined by the action direction 4 and the feed direction 3 in relation to cutting edge 26, and cutting edge 26 and cutting edge 30 are offset from the sheet metal 22 compared to the cutting edge 25. Accordingly, the edge of the sheet metal 22 is taken off in three layers by the shaping tool 21. Thus, an area of the workpiece in the form of a perpendicular prism with a surface in the form of a right triangle is removed by means of the cutting edge 25, and thin slivers of the sheet metal are removed by the cutting edges 26 and 30. Cutting edge 30 produces the beveled surface with the desired surface structure.

Figure 6:
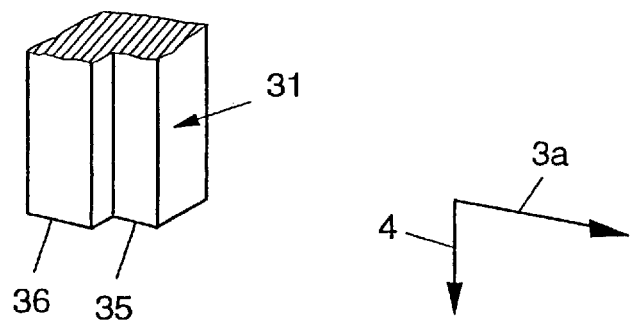
FIGS. 6, 7, 8, and 9 show fourth, fifth, sixth and seventh embodiments of shaping tools as viewed from the workpiece respectively.
Figure 7:
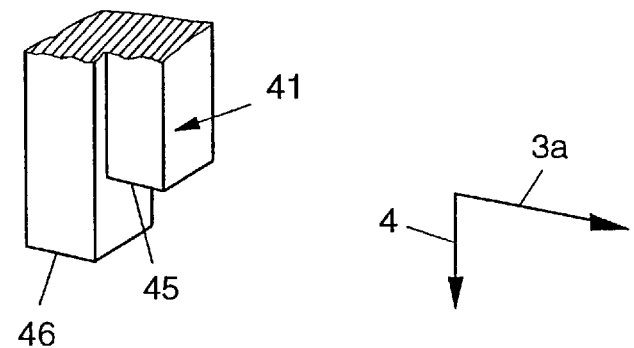
Figure 8:
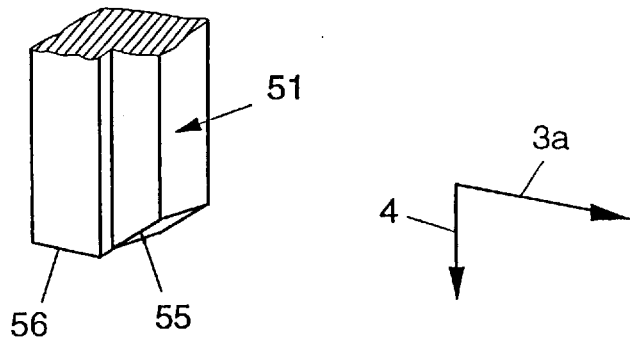

The shaping tools 31, 41 and 51 shown in FIGS. 6 to 8 have a leading cutting edge 35, 45, 55 and a back cutter in the form of a trailing cutting edge 36, 46, 56. The shaping tools 31, 41, 51 are designed to operate in a feed direction 3a, which extends oppositely of the feed direction 3 in FIGS. 1 to 5. The leading cutting edges 35, 45 extend perpendicularly to the action direction 4; the leading cutting edge 55 forms an angle of roughly 60° in the action direction 4. The leading cutting edge 35 and its trailing cutting edge 36 lie in the same plane perpendicular to the action direction 4. Leading cutting edge 45 is offset opposite the action direction 4 from the trailing cutting edge 46 on the shaping tool 41.

Figure 9:
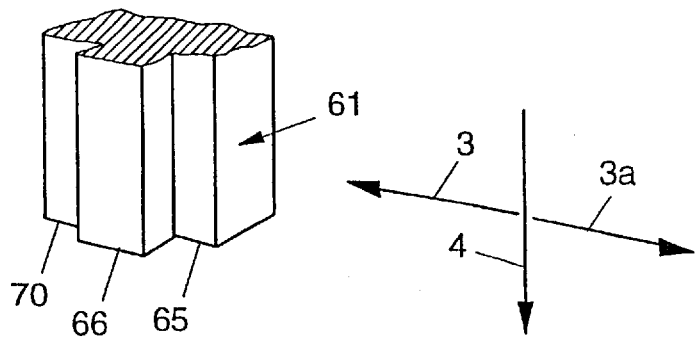

FIG. 9 shows a tool designed as a shaping tool 61 which can be moved relative to a workpiece to be tooled, optionally in one feed direction 4 or in the opposite feed direction 3a. The middle cutting edge 66, which trails in the feed direction 3a as the rear cutting edge of a front cutter which is of the leading cutting edge 65, and it is arranged in feed direction 3 behind a then leading cutting edge 70. Compared to the cutting edges 65, 70 on both sides, the middle cutting edge 66 is offset from the workpiece to be tooled, perpendicularly to the plane defined by the action direction 4 and the feed direction 3. All cutting edges extend in one and the same plane perpendicular to the action direction 4.

Figure 10:
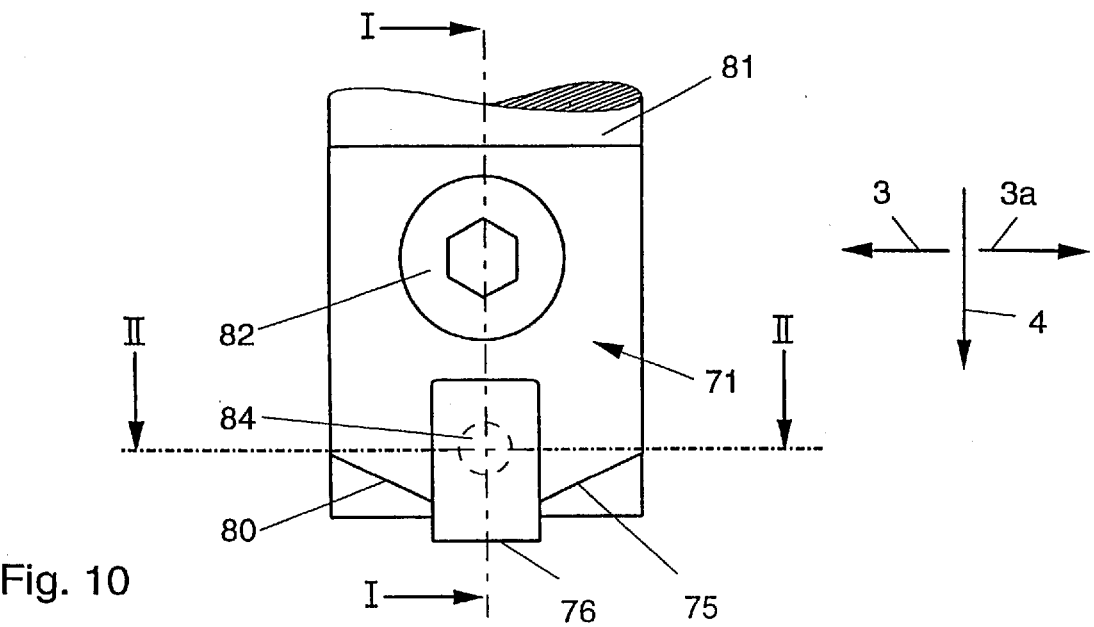
FIG. 10 shows an eighth embodiment of a shaping tool as mounted in a fragmentarily illustrated holder.
Figure 11:
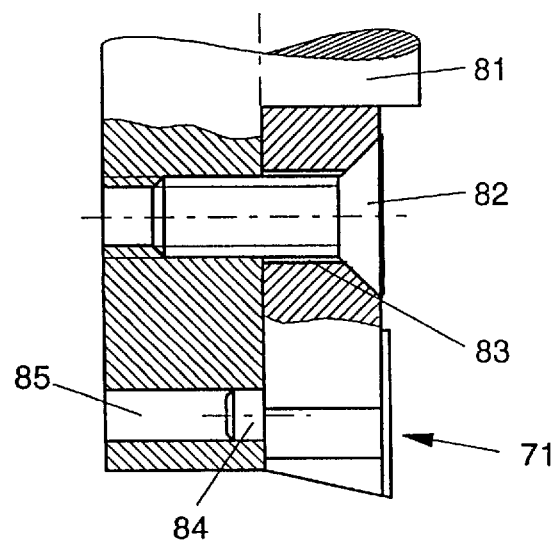
FIG. 11 is a sectional view along line I—I of FIG. 10.
Figure 12:
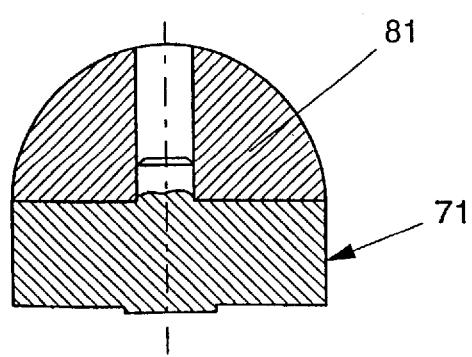
FIG. 12 is a sectional view along line II—II of FIG. 10.

According to FIGS. 10 to 12, a shaping tool 71 is attached to a tool holder 81. The tool holder 81 is designed as a round rod at its upper end as seen in FIGS. 10 and 11, and can be attached by that round rod area to a ram that can move up and down on a conventional drive unit.

FIG. 10 shows the ram 71 as viewed from the workpiece to be machined. The ram 71 has a middle cutter in the form of a middle cutting edge 76 and cutters on both sides of it in the form of cutting edges 75 and 80. The ram 71 can also be operated, like the ram 61 in FIG. 9, in two opposite feed directions. In relation to the two cutting edges on both sides 75, 80, the middle cutting edge 76 is offset from the workpiece to be machined perpendicular to the plane defined by the action direction 4 and the feed direction 3, 3a. While the middle cutting edge 76 extends perpendicularly to the action direction 4, the cutting edges 75, 80 form an angle of roughly 60° with that direction. Overall, this produces a mirror-symmetrical design of the cutting surfaces on ram 71 with regard to the plane in the direction of cutting line 1—1 perpendicular to the plane of projection in FIG. 10. A flat head screw 82 is used to attach the flat ram 71 to the toolholder 81, and it can be screwed through a hole 83 on the ram 71 into the tool holder 81. To keep the ram 71 from swiveling on the longitudinal axis of the flat head screw 82, especially during the machining operation, the ram 71 has a cylindrical pin 84 which is used as an anti-torsion safety device on the side turned away from the workpiece to be machined; it goes into the corresponding pin receptacle 85 in the workpiece holder 81 when mounted.

What is claimed is:

1. A machining tool for beveling edges on workpieces moveable in a feed direction along the edge of the workpiece to be machined and in an action direction perpendicular to the feed direction relative to the workpiece, said tool having a drive axis in the action direction with a mounting portion at one end for engagement in a tool holder of the beveling machine to effect reciprocation thereof in the action direction and a cutting portion at the other end, said cutting portion of said tool having at least two adjacent cutting edges extending transversely of said drive axis in the feed direction and providing at least one leading cutting edge and at least one trailing cutting edge, said at least one trailing cutting edge in the feed direction being offset below the leading edge in the action direction from said leading cutting edge to effect a further cut in the workpiece after it has been cut by said leading edge.

2. A machining tool according to claim 1 wherein at least one of said cutting edges extends substantially perpendicularly to the action direction.

3. A machining tool according to claim 1 wherein at least one of said cutting edges extends at an acute angle to the action direction.

4. A machining tool according to claim 3 wherein said acute angle is at least 60°.

5. A machining tool according to claim 1 wherein there are two end cutting edges and a middle cutting edge, one of said end cutting edges being the leading edge and the other two cutting edges being offset trailing edges.

6. A machining tool according to claim 5 wherein said middle cutting edge in the feed direction comprises the trailing edge and said end cutting edges provide leading edges in either direction of movement of the tool in the feed direction.

7. A machining tool according to claim 6 wherein said middle cutting edge extends substantially perpendicularly to the action direction and said other cutting edges extend at an acute angle to the action direction.

8. A machining tool according to claim 7 wherein said acute angle is at least 60°.

9. A machining tool according to claim 1 wherein there are an odd number of cutting edges and at least equal to 3, and wherein the middle cutting edge in the feed direction is offset from the other cutting edges perpendicularly to the plane defined by the action direction and the feed direction and said other cutting edges to either side of said middle cutting edge symmetrically offset about the center line of said middle cutting edge.

10. A machining tool for beveling edges on workpieces moveable in a feed direction along the edge of the workpiece to be machined and in an action direction perpendicular to the feed direction relative to the workpiece, said tool having a drive axis in the action direction with a mounting portion at one end for engagement in a tool holder of the beveling machine to effect reciprocation thereof in the action direction and a cutting portion at the other end, said cutting portion of said tool having two adjacent cutting edges extending transversely of said drive axis in the feed direction and providing a leading cutting edge and a trailing cutting edge, said trailing cutting edge in the feed direction being offset below said leading edge in the action direction from said leading cutting edge to effect an additional cut in the workpiece after it has been cut by said leading edge, at least one of said cutting edges extending substantially perpendicularly to the action direction.

11. A machining tool according to claim 1 wherein at least one of said cutting edges extends at an acute angle to the action direction.

12. A machining tool for beveling edges on workpieces moveable in a feed direction along the edge of the workpiece to be machined and in an action direction perpendicular to the feed direction relative to the workpiece, said tool having a drive axis in the action direction with a mounting portion at one end for engagement in a tool holder of the beveling machine to effect reciprocation thereof in the action direction and a cutting portion at the other end, said cutting portion of said tool having three adjacent cutting edges extending transversely of said drive axis in the feed direction and providing two end cutting edges and a middle cutting edge, either of said end cutting edges constituting a leading cutting edge and said middle cutting edge comprising a trailing cutting edge in the feed direction offset in the action direction below said end cutting edges to effect a further cut in the workpiece after it has been cut by said leading cutting edge, and at least one of said cutting edges extending substantially perpendicularly to the action direction.

13. A machining tool according to claim 12 wherein said middle cutting edge in the feed direction comprises the trailing edge and said end cutting edges provide leading edges in either direction of movement of the tool in the feed direction.

14. A machining tool according to claim 13 wherein said middle cutting edge extends substantially perpendicularly to the action direction and said other cutting edges extend at an acute angle to the action direction.

15. A machining tool according to claim 14 wherein said acute angle is at least 60°.

\* \* \* \* \*